W. N. ALLAN.
VEHICLE WHEEL.
APPLICATION FILED AUG. 8, 1919.

1,340,592.

Patented May 18, 1920.
2 SHEETS—SHEET 1.

WITNESSES:

INVENTOR
William N. Allan,
BY
ATTORNEY

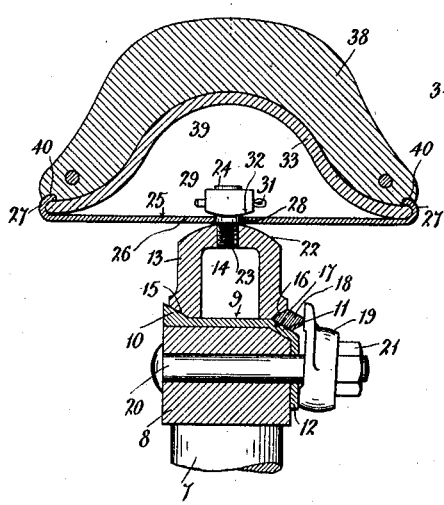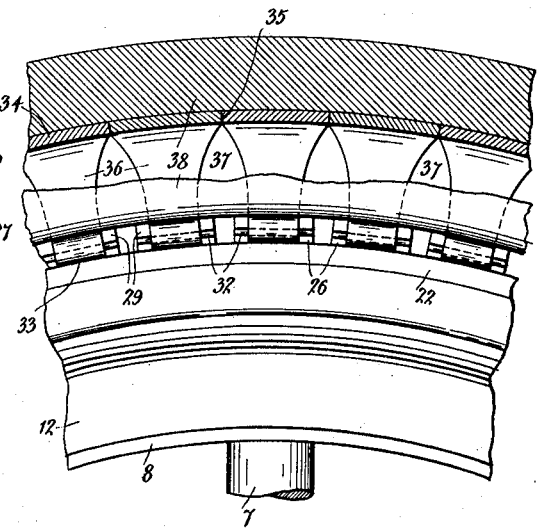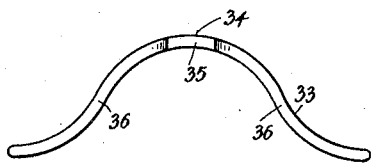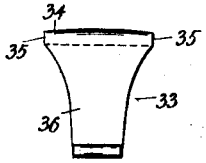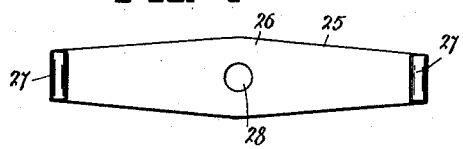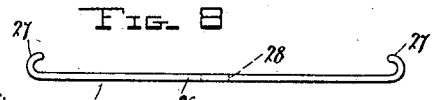

UNITED STATES PATENT OFFICE.

WILLIAM N. ALLAN, OF SAN ANTONIO, TEXAS.

VEHICLE-WHEEL.

1,340,592.  Specification of Letters Patent.  Patented May 18, 1920.

Application filed August 8, 1919. Serial No. 316,162.

*To all whom it may concern:*

Be it known that I, WILLIAM N. ALLAN, a citizen of the United States, residing at San Antonio, in the county of Bexar and State of Texas, have invented new and useful Improvements in Vehicle-Wheels, of which the following is a specification.

This invention relates to vehicle wheels, and particularly to a tire therefor. The present invention embodies features of improvement relatively to the construction of the tires disclosed in my pending application, Serial No. 159,702, filed April 4, 1917, and my United States Patents Nos. 1,290,033 and 1,297,052, patented January 7, 1919 and March 11, 1919, respectively, and one of the applications Serial No. 316,163, executed and filed of even date herewith. As in my previous tire structures disclosed by the foregoing applications and patents, one of the objects of the present improvement is to dispense with all fastening bolts, rivets, or other penetrating devices in so far as practicable, and particularly in connection with that part of the tire which carries the tread device, and thereby avoid weakening the parts of the tire as much as possible and to facilitate the assemblage of the tire members in strong operative relation. In the present tire construction, flat springs extending in transverse directions equally on opposite sides of a demountable rim are employed and connect with tire-supporting clips or holding devices extending upwardly and outwardly within a solid tire device and providing a chamber or space in which the springs are free to operate without liability of breakage and with sensitive resilient action. The springs are so arranged as to work freely in any direction and compensate for side stress as well as angular positions to accommodate variations in the road surface over which the wheel bearing the tire may move.

The invention consists in the preferred construction and arrangement of the several parts which will be more fully hereinafter described and claimed.

In the drawings:

Fig. 3 is a transverse vertical section of a portion of the wheel and tire on an enlarged scale.

Fig. 4 is a side elevation of a portion of a wheel embodying the improved tire and showing the latter partially in longitudinal section.

Fig. 5 is a detail edge elevation of one of the tire device supporting clips.

Fig. 6 is an end elevation of the clip shown by Fig. 5.

Figs. 7 and 8 are respectively a plan view and an edge elevation of one of the flat springs.

Fig. 9 is a detail perspective view of one of the spring securing heads or nuts.

Figure 1:
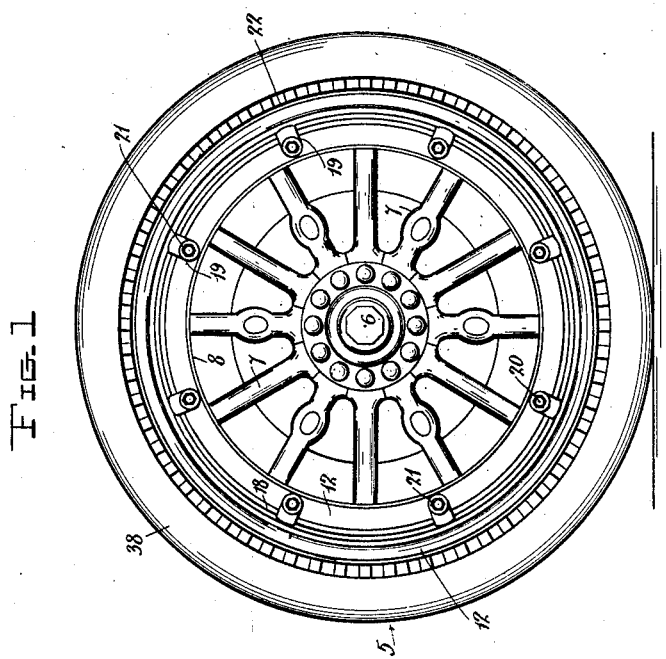
Figure 1 is a side elevation of a wheel embodying the features of the invention.
Figure 2:
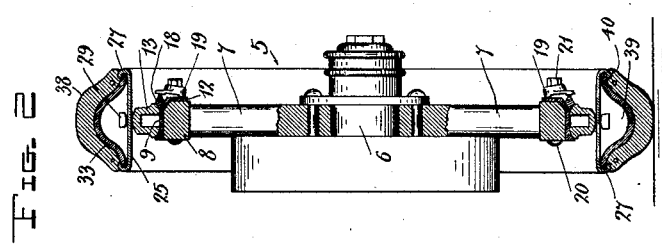
Fig. 2 is a transverse central section of the improved wheel.

The numeral 5 designates a wheel embodying a hub 6 and spokes 7 radiating from the hub to the felly 8 and provided with a metal rim 9 having a beveled side edge 10 projecting outwardly, the opposite side edge being struck inwardly at an angle, as at 11, and continued into a flange 12 extending over a portion of one side of the felly and held fixed to the latter. The felly, as shown, is preferably made of wood, but it is obvious that it could be constructed of metal and have the periphery thereof shaped to correspond to the contour of the rim 9. In other words, the felly and the rim may be made in either one or two parts, the metal rim 9, as shown, obviating wear on the felly when the latter is constructed of wood. The wheel is also provided with a removable rim 13 which is channeled or made hollow, as at 14, and is held on and surrounds the fixed rim 9, the base of the rim 13 being formed with opposite bevels as at 15 and 16, the bevel 15 snugly fitting upon the enlarged beveled side edge 10 of the rim 9 and the bevel 16 coöperating with the downward bevel 11 of said rim 9 to form a seat 17 in which a locking or keying ring 18 is removably held by flange collars or washers 19 engaged by bolts 20 extending through the felly 8, the washers 19 being held in snug engagement with the ring 18 as shown by Fig. 3 through the medium of nuts 21. It will therefore be understood that the rim 13 together with the improved tire organization of which it forms a part may be readily withdrawn from or applied over the felly 8 and rim 9 of the wheel 5 and when in applied position will be positively held against displacement or loose movement. The outer edge of the removable rim 13 is formed convex, as at 22, and at intervals screw studs project from the center of the said rim, as at 23, and are formed with smooth stems 24 standing outwardly from the rim an equal distance around the latter.

The present improved tire organization also embodies flat connecting springs 25, shown in detail by Figs. 7 and 8, and each provided with a comparatively wide central portion 26 from which the remaining parts taper or converge toward opposite terminals where upturned hooks 27 are formed, said hooks occupying an outward position when the springs are applied. Each spring also has an opening 28 through the center thereof of a dimension to fit over one of the smooth stems 24 of one of the studs 23 and to be secured in place by a head or elongated nut 29 fitted over the stem and having an opening 30 extending transversely therethrough to coincide with a similar opening in the stem for a removable cotter pin 31 inserted through the head and stem. The central portion of each spring is disposed adjacent to the convex outer edge of the rim 13 and each head or nut 29 has an inner convex edge 32 adjacent to its respective spring center to permit the spring to have movement inwardly and outwardly relatively to these opposed convex surfaces or faces and thereby provide for regularly bending the spring without sharp angles or having the same come in contact with resisting flat surfaces. By thus mounting each spring, fracture thereof at the center is less liable to occur and in fact will be prevented and at the same time ample play is given to each spring to effect the function which it is desired to have it perform. The improved tire organization also embodies a plurality of transversely extending clips 33 which in the present instance are continuous from one side to the opposite side of the tire. Each slip 33 has a comparatively broad center 34 with straight side edges 35 and from this center the opposite extremities of each clip converge or are reduced, as at 36. Each clip is also arched, the apex of the arch being the comparatively wide or broad center 34, and the opposite extremities 36 near their terminals are given an inward bend or are concavo-convex, with the concave surfaces outward. The several clips have their side edges 35 at the center contiguous as shown by Fig. 4, and their opposite extremities separated by spaces 37 in view of the converging construction of the clip extremities. Applied over the several clips 33 and extending to the opposite terminals is a tire device 38 which is solid and preferably formed of rubber or rubber composition, or any other yielding material adapted for the purpose. It will thus be seen that the tire device incloses the clips and, owing to the arched form of the latter, a chamber or space 39 is formed within the clips and between the latter and the springs 25, the said springs having their terminal hooks 27 removably caught over or engaging the opposite terminals or ends of the clips and extending into grooves 40 formed in the tire device adjacent to the ends or terminals of the clips. A very simple form of spring tire is thus produced, the clips 33 in this instance being of spring material and having a yielding action through pressure on the tread device, the clips tending to flatten against the resistance of the flat springs 25 and hence this improved form of tire has a duplex spring action of a sensitive character to take up shocks and vibrations and to permit a ready conformation to irregularities in the road surface over which the tire moves.

When weight pressure is imposed on the tire, the springs 25 are forced downwardly or outwardly into the chamber 39 and the tendency is to draw inwardly on the ends of the clips 33, but owing to the radial stress on the tire device and centrally with relation to the clips a counteracting resistance is set up to the inward contraction of the ends of the clips with the result that a multiplied or increased resilience ensues in the tire with material benefit in the cushioning effect thereof. When the springs bend under weight stress, their outer extremities turn or curve on the adjacent convex portions or surfaces of the clip extremities, and this operation conjointly with the movement of the centers of the springs relatively to the convex faces 22 and 32 of the rim 13 and heads or nuts 29 obviates any tendency to fracture the springs during their operation. The springs may be readily removed and replaced and the tire as a whole is capable of being expeditiously mounted as the association of the several parts thereof is very simple in view of the comparatively small number of elements comprised in its organization.

What is claimed is:

1. A tire comprising a removable rim, a plurality of arch-shaped clips disposed over and extending outwardly beyond the opposite sides of the rim, a tread device mounted over the clips, and transversely extending continuous flat springs intermediately secured to the rim and terminally engaging the opposite ends of the clips, the said springs also extending outwardly beyond the opposite sides of the rim.

2. A tire comprising a removable rim, a tread device having arched supporting means inclosed therein and having portions of their side edges in engagement, and transversely extending continuous flat springs connected to and projecting outwardly beyond opposite sides of the rim and terminally engaging opposite portions of the supporting means.

3. A tire comprising a removable rim, and a yielding solid tread device having supporting means therein and resilient connections between the same and rim, the supporting means and the resilient connections extending outwardly beyond opposite sides of the rim, the said connections being continuous and flat and intermediately attached to the rim.

4. A tire comprising a removable rim, a solid tread device, a plurality of arched clips within the tread device and having engagement at their central side edge portions, and a plurality of transversely extending continuous flat springs centrally connected to the rim and having the opposite ends thereof bent into hook form for separably engaging the opposite terminals of the arched clips, the arch clips and the flat springs having their opposite ends in engagement at distances outwardly beyond the opposite side portions of the rim.

In testimony whereof I have hereunto set my hand in presence of two subscribing witnesses.

WILLIAM N. ALLAN.

Witnesses:
JAMES L. MURRILL,
LEWIS M. KEIZER.